United States Patent [19]

Shimada et al.

[11] Patent Number: 4,778,866
[45] Date of Patent: Oct. 18, 1988

[54] ETHYLENE COPOLYMER

[75] Inventors: Takeo Shimada; Iwao Ishino; Noriyuki Okada; Tsutomu Isaka; Akiyoshi Oonishi, all of Mie; Masaki Saito, Ibaraki; Shuhei Doi, Mie, all of Japan

[73] Assignee: Mitsubishi Petrochemical Co., Ltd., Tokyo, Japan

[21] Appl. No.: 882,392

[22] Filed: Jul. 7, 1986

[30] Foreign Application Priority Data

Jul. 8, 1985 [JP] Japan .................................. 60-149671
Jul. 8, 1985 [JP] Japan .................................. 60-149672
Nov. 6, 1985 [JP] Japan .................................. 60-248480

[51] Int. Cl.[4] .................................................. C08F 18/20
[52] U.S. Cl. ................................. 526/245; 526/292.1; 526/292.7; 526/313
[58] Field of Search ................... 526/245, 292.1, 292.7, 526/313

[56] References Cited

U.S. PATENT DOCUMENTS

| | | | |
|---|---|---|---|
| 3,162,676 | 12/1964 | Goldberg et al. | 260/486 |
| 3,173,893 | 3/1965 | Fertig et al. | 526/313 |
| 3,384,628 | 5/1968 | Pittman et al. | 526/245 |
| 3,418,301 | 12/1968 | Spivey et al. | 526/292.7 |
| 3,520,863 | 7/1970 | Anello et al. | 526/245 |
| 4,158,097 | 6/1979 | Naarmann | 526/292.1 |
| 4,310,650 | 1/1982 | Gupta et al. | 526/313 |
| 4,474,982 | 10/1984 | Howells | 526/245 |

FOREIGN PATENT DOCUMENTS 1274761 9/1961 France .
1168396 10/1969 United Kingdom .

Primary Examiner—Joseph L. Schofer
Assistant Examiner—Peter Mulcahy
Attorney, Agent, or Firm—Oblon, Fisher, Spivak, McClelland & Maier

[57] ABSTRACT

An ethylene copolymer comprising an ethylene unit and an ester unit selected from ethylenically $\alpha,\beta$-unsaturated acid esters represented by the formula (I) or (II):

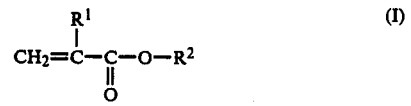

wherein $R^1$ represents a hydrogen atom or a methyl group; and $R^2$ represents a halogenated alkyl group having from 1 to 15 carbon atoms;

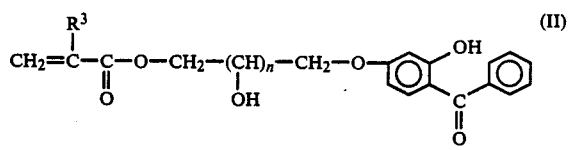

wherein $R^3$ represents a hydrogen atom or a methyl group; and n represents 0 or 1, wherein said ester unit is present in a total amount of from 0.001 to 10 mol %. The copolymer has excellent dielectric breakdown characteristics, such as electricity treeing property, water treeing property, etc., and is useful as an insulating material for high-voltage cables.

4 Claims, 2 Drawing Sheets

ETHYLENE COPOLYMER

FIELD OF THE INVENTION

This invention relates to a novel ethylene copolymer. More particularly, it relates to an ethylene copolymer having excellent dielectric characteristics, particularly dielectric breakdown characteristics, such as electricity treeing property, water treeing property, etc., which is industrially useful as a power cable insulating material.

BACKGROUND OF THE INVENTION

Crosslinked polyethylene derived from low density polyethylene is widely used as an insulating material of a CV cable (crosslinked polyethylene-insulated vinyl jacket power cable) because of its excellent electric characteristics and heat resistance. However, since it meets dielectric breakdown at ultra-high voltages, it has been demanded to develop insulating materials having higher performance characteristics.

Various attempts have been made to improve the dielectric breakdown characteristics at ultra-high voltages as described, e.g., in T. Fukada et al., I.E.E.E., E117 (5), (1982).

If there are voids or impurities, such as water, metals, etc., electric charges are concentrated thereto, thereby causing reduction in dielectric breakdown characteristics. For this reason, studies have been directed mainly to the techniques of removing such impurities. For example, clean polyethylene containing no impurities of 100 μm or more in particle size or a dry crosslinking method which does not produce voids has been proposed as disclosed, e.g., in M. Takaoka, I.E.E.E., Trans. Power Appar. Syst., 102 (9), 3254–3263 (1983). A practical application of these techniques has led to production of a 275 KV cable. However, crosslinked polyethylene-insulated power cables for such a high voltage have a disadvantage of a seriously increased thickness of the insulating layer. It has been, therefore, desired for the cable insulating material to have further improved dielectric characteristics.

Another attempt is to add a voltage stabilizer, such as calcium stearate, polystyrene, various aromatic compounds, etc., considering that the thickness of the insulating layer can be decreased if the insulating material per se functions to prevent concentration of electric charges, as described, e.g., in Japanese Patent Publication No. 24809/73, West German Pat. No. 1,248,773, French Pat. No. 1,464,601, etc. The addition of such an additive, however, suffers from a disadvantage in that the additive bleeds out and the performances of the cable cannot be maintained over a long period of time.

Known comonomers that are copolymerizable with ethylene and relevant to the comonomer component according to the present invention include 2-hydroxy-4-(3-methacryloyloxy-2-hydroxypropyloxy)benzophenone described in U.S. Pat. No. 3,162,676, 2-(hydroxyphenyl)-5-acryloylaminobenzotriazole described in U.S. Pat. No. 3,072,585, 2-(2-hydroxy-4-methyl-3-propenylphenyl)benzotriazole described in British Pat. No. 981,539, etc.

In practice, however, these known comonomers often encounter various problems hard to solve, such as high prices, low purity, poor copolymerizability, difficulty in increasing a degree of polymerization, and the like. Therefore, this methodology has not been placed into practical use, still awaiting further investigations.

In the particular cases of producing ethylene copolymers by high-pressure polymerization in which it is keenly demanded not to involve a high cost and the production conditions are strictly limited, it is considered virtually impossible to industrialize copolymers using these monomers.

In some detail, it is industrially difficult to increase the purity of the above-described 2-hydroxy-4-(3-methacryloyloxy-2-hydroxypropyloxy)benzophenone that is relevant to the vinyl monomer of the formula (II) hereinafter described according to the present invention to 70% or higher due to restrictions on the process for production. The impurities adverseLy influence polymerizability and performance properties of the resulting copolymers, resulting in a failure to solve the above-described problems.

In addition, although the above-described monomer possibly promises to be copolymerized with ethylene, it finds a great technical difficulty in copolymerizing with ethylene unlike methyl acrylate, styrene, etc. which are relatively easy to copolymerize with ethylene. Therefore, this monomer has not yet been turn to practical use.

SUMMARY OF THE INVENTION

In the light of these circumstances, the inventors have been involved in developing an ethylene copolymer excellent in all of dielectric breakdown characteristics, long-term performance retention properties, flexibility and freedom from a metallic catalyst residue and, as a result, succeeded in finding an excellent ethylene copolymer.

The present invention relates to a novel ethylene copolymer comprising an ethylene unit and an ester unit selected from ethylenically α,β-unsaturated acid esters represented by the formula (I) or (II):

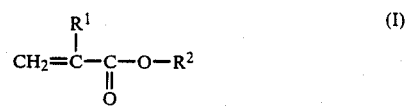

wherein $R^1$ represents a hydrogen atom or a methyl group; and $R^2$ represents a halogenated alkyl group having from 1 to 15 carbon atoms;

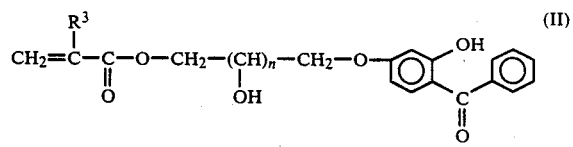

wherein $R^3$ represents a hydrogen atom or a methyl group; and n represents 0 or 1, wherein said ester unit is present in an amount of from 0.001 to 10 mol% in total.

The novel ethylene copolymer of this invention satisfies all the performances required as an insulating material for power cables, such as dielectric characteristics, long-term performance retention properties, flexibility, freedom from metallic catalyst residues, cable coating (working) properties, and the like, and are extremely useful as an insulating material for power cables of high voltages.

DETAILED DESCRIPTION OF THE INVENTION

Figure 1:
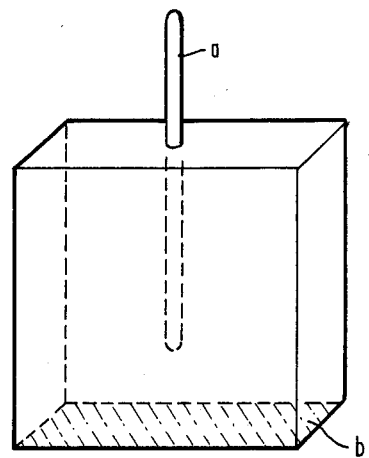
FIG. 1 illustrates a specimen for measurement of electricity treeing property.

The novel ethylene copolymer of the present invention comprises an ethylene unit and from 0.001 to 10 mol% of an ester unit selected from ethylenically $\alpha,\beta$-unsaturated acid esters represented by the above-described formula (I) or (II).

In the above-described formula (I), the halogenated alkyl group as represented by $R^2$ includes a dibromomethyl group, a dichloromethyl group, a trifluoroethyl group, a difluoromethyl group, a trichloroethyl group, a tribromoethyl group, a triiodoethyl group, a monofluoroethyl group, a monochloroethyl group, a monochloromethyl group, a monofluoromethyl group, a monobromomethyl group, a trifluoromethyl group, a trichloromethyl group, a tribromomethyl group, a triiodomethyl group, a tetrafluoroethyl group, a tetrachloroethyl group, a tetrabromoethyl group, a pentafluoroethyl group, a pentachloroethyl group, a pentabromoethyl group, a pentafluoropentadecanyl group, a pentachlorotridecanyl group, a heptafluorodecanyl group, a heptadecylfluorodecanyl group, a heptadecylchlorodecanyl group, a hexafluorononyl group, a heptadecylchlorodecanyl group, etc.

As is obvious from the above-enumerated specific examples, the halogen atom in $R^2$ of the formula (I) includes a fluorine atom, a chlorine atom, a bromine atom and an iodine atom. Of these, a fluorine atom and a chlorine atom are preferred, with a fluorine atom being more preferred.

Specific examples of the monomer represented by the formula (II) of the invention include 2-(4-benzoyl-3-hydroxyphenoxy)ethyl methacrylate, 2-(4-benzoyl-3-hydroxyphenoxy)ethyl acrylate, 2-hydroxy-4-(2-hydroxy-3-methacryloxy)propoxybenzophenone and 2-hydroxy-4-(2-hydroxy-3-acryloxy)propoxybenzophenone.

The polymer structure of the ethylene copolymer containing the above-described comonomer unit of the formula (I) or (II) is not particularly restricted, but the preferred are random copolymers and graft copolymers comprising an ethylene polymer as a main chain and the unit of the formula (I) or (II) grafted thereonto.

The novel ethylene copolymer of the present invention may comprise an ethylene unit and one or more ester units selected from ethylenically $\alpha,\beta$-unsaturated acid esters represented by the above-described formula (I) or (II).

In addition to the above-described comonomers, the ethylene copolymer of the present invention can further contain other monomers for modification in a proportion up to 10 mol%. The modification comonomers which can be used include those known to be copolymerizable with ethylene, such as vinyl esters, e.g., vinyl acetate, vinyl propionate, etc.; acrylic esters, e.g., ethyl acrylate, methyl acrylate, butyl acrylate, etc.; methacrylic esters, e.g., methyl methacrylate, ethyl methacrylate, butyl methacrylate, etc.; and ethylenically $\alpha,\beta$-unsaturated acids, e.g., acrylic acid, methacrylic acid, etc.

The ethylene copolymer in accordance with the present invention has a number average molecular weight of from about 1,000 to about 100,000. If the molecular weight is less than 1,000, the performances of the ethylene copolymer cannot be maintained for long periods of time. A preferred molecular weight is from about 3,000 to 70,000, and more preferably from about 10,000 to about 50,000. The number average molecular weight as herein referred is determined by gel-permeation chromatography.

The ethylene copolymer of the present invention has a melt flow rate (MFR) of not less than 0.01 g/10 min, a density of from 0.88 g to 1.00 g/cm$^3$, and preferably from 0.91 to 1.00 g/cm$^3$, and a degree of crystallinity of from 25 to 70%, and preferably from 35 to 65%. The MFR as herein referred is measured in accordance with JIS K6760. The density as herein referred is measured in accordance with JIS K6760. The crystallinity as herein referred is measured by X-ray diffractometry as described in S. L. Aggarwal and G. P. Tilley, *Journal of Polymer Science*, 18, 17–26 (1955).

The ethylene copolymer of the present invention can be produced by subjecting prescribed monomers to radical copolymerization. An apparatus for producing low density polyethylene by high-pressure polymerization can be employed to advantage.

The catalyst to be used in the production of the ethylene copolymer of the present invention is a known radical-generating initiator. Specific examples of such an initiator include oxygen, dialkyl peroxides and derivatives thereof, e.g., di-t-butyl peroxide, t-butylcumyl peroxide, dicumyl peroxide, etc.; diacyl peroxides, e.g., diacetyl peroxide, dioctanoyl peroxide, etc.; peroxy dicarbonates, e.g., diisopropyl peroxy dicarbonate, di-2-ethylhexyl peroxy dicarbonate, etc.; peroxy esters, e.g., t-butyl peroxy isobutyrate, t-butyl peroxy pivalate, t-butyl peroxy laurate, etc.; ketone peroxides, e.g., methyl ethyl ketone peroxide, cyclohexanone peroxide, etc.; peroxy ketals, e.g., 2,2-bis-t-butyl peroxy octane, 1,1-bis(t-butyl peroxy)cyclohexane, etc.; hydroperoxides, e.g., t-butyl hydroperoxide, cumene hydroperoxide, etc.; and azo compounds, e.g., 2,2'-azobisisobutyronitrile, etc.

The polymerization is preferably carried out continuously. The polymerization apparatuses to be used include a continuous stirring type vessel reactor or a continuous tubular reactor that is commonly employed in high pressure radical polymerization of ethylene.

The polymerization can be performed either in a single reaction zone using a single reactor or in a plurality of reaction zones using a plurality of reactors connected in series with, in some cases, coolers connected thereto or using a single reactor the inside of which is divided into a plurality of zones. In the case of multizone polymerization, reaction conditions, such as a monomer composition, a catalyst concentration, a molecular weight controller concentration, etc., in each zone or reactor may be adjusted to as to control the characteristics of the polymer obtained in each zone or reactor. In the case where a plurality of reactor are connected in series, not only a combination of two or more vessel reactors or two or more tubular reactors but a combination of at least one vessel reactor and at least one tubular reactor can be employed.

The ethylene copolymer of the present invention can be produced by feeding a monomer composition comprising ethylene and a monomer selected from the compounds of the formula (I) or (II) to the above-described polymerization apparatus to effect radical polymerization in the presence of the above-described catalyst. A proportion of ethylene and the comonomer of the formula (I) or (II) is appropriately selected so as to obtain the ethylene copolymer of the desired composition. In general, since the vinyl monomer of the formula (I) or (II) has higher polymerizability than ethylene, they are used in an amount of from 0.00003 to 5 mol%, and preferably from 0.00005 to 3 mol%, based on the total monomers in the polymerization system.

The polymerization pressure is higher than 500 kg/cm$^2$, and preferably in the range of from 1,000 to 4,000 kg/cm$^2$. The polymerization temperature is not lower than 120° C., and preferably in the range of from 150° to 300° C.

The polymer produced in one or more reactors is separated from the unreacted monomers and processed in the same manner as in the production of usual high-pressure-processed polyethylene. The unreacted monomer mixture is mixed with supplementary fresh monomers and, after increasing its pressure, returned to the reactor. The composition of fresh monomers to be supplemented is such that the unreacted monomer mixture may have the equal composition to the original feed. In general, the supplementary fresh monomers have a composition nearly equivalent with that of the polymer recovered from the reactor.

When copolymers having a uniform composition are desired, a vessel reactor is preferred. On the other hand, a tubular reactor is preferred in cases of using the resulting copolymers as ultraviolet absorbing films, etc., in which it is required to achieve high copolymerization reaction rates of monomers. For example, the conversion of the comonomer of the formula (II) should be at least 85% by weight, and preferably at least 90% by weight. Conversions less than 85% by weight cause whitening of the resulting films.

The catalyst is usually dissolved in a solvent having a small chain transfer effect and injected directly into a reactor by means of a high pressure pump. Suitable examples of the solvent to be used are hexane, heptane, white spirit, hydrocarbon oils (e.g., gasoline, kerosene, gas oil, etc.), cyclohexane, toluene, fatty acid esters, and mixtures thereof. The concentration of the catalyst is preferably from about 0.5 to about 30% by weight.

Similarly, the vinyl monomer of the formula (I) or (II) is dissolved in a solvent having a small chain transfer effect as exemplified above and injected directly into the reactor by means of a high pressure pump.

In the above-described polymerization except for special cases, a chain transfer agent is used to control the molecular weight of polymers. Examples of the chain transfer agent to be employed include alkanes, e.g., ethane, propane, hexane, heptane, etc.; alkenes, e.g., propylene, butene, hexane, etc.; alcohols, e.g., ethanol, methanol, propanol, etc.; ketones, e.g., acetone, methyl ethyl ketone, etc.; aldehydes, e.g., acetaldehyde, propionaldehyde, etc.; and the like. Gaseous components are introduced into an inlet of a compressor, whereas liquid components are injected into the reactor by means of a pump.

The thus produced ethylene copolymer of the present invention is separated from the unreacted monomers in a separator according to the usual procedure for high-pressure radical polymerization. The recovered ethylene copolymer may be used as it is as a final product or, if desired, may be subjected to various post-treatments commonly applied to the products as obtained by the usual high pressure radical polymerization.

In addition to the above-discussed high pressure radical polymerization, the ethylene copolymer according to the present invention can also be produced by a process, in which the monomer of the formula (I) or (II) is grafted to a commercially available high-pressure polyethylene or low-pressure polyethylene, such as low-density polyethylene, medium-density polyethylene, high-density polyethylene, an ethylene-vinyl acetate copolymer, an ethylene-acrylic acid copolymer, an ethylene-methacrylic acid copolymer, an ethylene-methyl acrylate copolymer, an ethylene-methyl methacrylate copolymer, an ethylene-ethyl acrylate copolymer, etc. The graft reaction can be carried out by a known graft polymerization process. For example, the above-enumerated commercially available polyethylene and the monomer of the formula (I) or (II) are mixed in such a proportion as to result in a desired copolymer composition, and the above-described organic peroxide is added thereto. The mixture is mixed in a super mixer, etc., and then heat-kneaded in a single-screw extruder, a twin-screw extruder, a Banbury mixer, etc. In this process, conditions usually employed in graft modification of polyethylene, etc. can be applied.

The novel ethylene copolymer according to the present invention is excellent particularly in dielectric characteristics, such as impulse breakdown characteristics, electricity treeing property, water treeing property, and the like, and satisfies performance requirements for insulating materials for power cables, such as long-term performance retention properties, flexibility, freedom from metallic residues, cable coating (working) properties, and so on. In particular, the ethylene copolymer of the present invention exhibit excellent performance properties as insulating material for high-voltage power cables.

The performance and use of the ethylene copolymer according to the present invention will be described in some detail separately referring to the copolymer of ethylene and the monomer of the formula (I) and the copolymer of ethylene and the monomer of the formula (II).

Since the former copolymer containing the monomer of the formula (I) exhibits not only excellent dielectric breakdown characteristics but also flame retardant properties, it is applicable to various uses in addition to the use as power cable insulating material. For example, it can be used as a wire and cable coating insulant by extrusion molding or as an insulating film, a film for general use or a flame retardant film by T-die extrusion or blown-film extrusion.

Further, this copolymer can be molded into various molded products by blow molding, injection molding, extrusion molding, and the like. In an embodiment of extrusion molding, the copolymer can be extrusion-coated on a base film made of plastics or other materials, e.g., metal foils, paper, cloth, etc., to obtain a laminate film.

Belonging to thermoplastic resins, the above-described ethylene copolymer may be blended with other thermoplastic resins, e.g., polyethylene, polypropylene, an ethylene-vinyl acetate copolymer, etc., as is usual for this kind of resin materials. Moreover, it may contain compounding additives, such as petroleum resin, waxes, stabilizers, antistatic agents, antioxidants, voltage stabilizers, carbon black, ultraviolet absorbents, synthetic or natural rubbers, lubricants, inorganic fillers, etc.

The above-described ethylene copolymer may be cross-linked by a chemical crosslinking agent or electron rays or by graft copolymerization with vinyltrimethoxysilane, etc. The chemical crosslinking agent to be used is conventional and includes dicumyl peroxide, Percadox, etc. The cross-linked ethylene copolymer can also contain compounding additives, such as antioxidants.

On the other hand, the comonomer represented by the formula (II) is excellent in copolymerizability with ethylene, does not substantially become a bar to improvement of polymerization degree, and has high ultraviolet absorbing property. Further, it can be obtained at high purity and at low cost and exhibits heat decomposition resistance, safety and on-coloring property. The copolymer composed of ethylene and this comonomer of the formula (II) exhibits high weather resistance and ultraviolet absorbing property without suffering from bleeding out of the ultraviolet absorbing component. Such an ultraviolet absorbing ethylene copolymer contains from 0.001 to 10 mol% of the vinyl monomer of the formula (II).

If the content of the vinyl monomer of the formula (II) exceeds 10 mol%, the ethylene copolymer has reduced moldability and mechanical properties. Further, too a large proportion of the monomer of the formula (II) results in reduction of uptake of the monomer of the formula (II) into the ethylene copolymer, which not only is unfavorable from the standpoint of polymerization operations but leads to a substantial loss of the monomer of the formula (II) that is more expensive than ethylene. If the content off the monomer of the formula (II) is less than 0.001 mol%, the effects of improving weather resistance and ultraviolet absorbing properties are insufficient.

In order to obtain the above-described effects, it is important that the copolymer comprising ethylene and the vinyl monomer of the formula (II) be a substantial random copolymer, in which the vinyl monomer is uniformly present among a component consisting mainly of ethylene. If it has a structure of a substantial block copolymer, the monomer of the formula (II) cannot exert its full effects to improve weather resistance and to imput ultraviolet absorbing property.

Therefore, the vinyl monomer of the formula (II) according to the present invention is essentially different in terms of mode of existence combined with its content from homopolymers of the vinyl monomer of the formula (II) or its analogous compound or oligomers having a high content of the monomer of the formula (II) exceeding 10 mol%, that are used as a kind of additives.

As described above, the ethylene copolymer comprising ethylene and the monomer of the formula (II), especially in the form of a random copolymer, possesses excellent characteristics inherent in ethylene-containing copolymers as well as high weather resistance and is, therefore, useful in the fields demanding high weather resistance in addition to the characteristics of ethylene-containing copolymes, for example, as greenhouse films and mulch films for agriculture, various pipes for outdoor use, and related parts.

In addition, since the above-described ethylene copolymer is substantially colorless, it is also useful as packing films, bottles or other containers for commercial goods, such as clothing, foodstuff, etc., that are liable to quality reduction due to discoloration or oxidative denaturation by ultraviolet rays. Polymer blends of the above-described ethylene copolymers with other polymers such as polyolefins, e.g., polyethylene, polypropylene, an ethylene-propylene copolymer, etc., can also find the same uses as described above.

The above-described ethylene copolymer of the present invention, when applied to these uses, may have incorporated therein various known additives, such as benzophenone type ultraviolet absorbents, benzotriazole type ultraviolet absorbents, hindered amine type photo-stabilizers, nickel phenolate type photo-stabilizers, phenol type antioxidants, sulfur type antioxidants, phosphorus type antioxidants, and, in addition, metal poison inhibitors, antiblocking agents, slip agents, nuclear agents, antistatic agents, anti-dewdrop agents, flame retardants, crosslinking agents, voltage stabilizers, colorants, and the like.

When the above-described ethylene copolymer having ultraviolet absorbing property is molded into films, sheets, pipes or the like products, the number average molecular weight thereof preferably ranges from about 10,000 to about 100,000. If it is less than 10,000, the physical properties of the resulting molded products are often insufficient for practical use. In the case where the copolymer is blended with not more than 5% by weight of other polymers, the number average molecular weight of the copolymer may be less than 10,000 but is preferably not less than 1,000. If it is less than 1,000, the resulting molded products suffer from bleeding out. The number average molecular weight as herein referred is determined by gel-permeation chromatography.

This invention will now be illustrated in greater detail with reference to the following examples, but it should be understood that they are not intended to limit the present invention. In these examples, the number average molecular weight of ethylene copolymers was determined by gel-permeation chromatography; the comonomer content was determined by infrared spectroscopic analysis; and the MFR was measured in accordance with JIS K6760.

EXAMPLE 1

To a 1.5 liter-volume autoclave type continuous reactor equipped with a stirrer were continuously fed 40 kg/hr of ethylene, 0.17 l/hr of a 500 g/l solution of trifluoroethyl acrylate (TFEA) in ethyl acetate, 560 Nl/hr of propylene and 570 ml/hr of a 2 g/l of a solution of t-butyl peroxyisobutylate in n-hexane as a catalyst, and the mixture was allowed to polymerize at a temperature of 220° C. under a pressure of 2,400 kg/cm$^2$ to produce an ethylene copolymer. The resulting ethylene copolymer had an MFR of 2.6 g/10 min, a number average molecular weight of 20,300 and a TFEA content of 0.29 mol%.

EXAMPLE 2

An ethylene copolymer was produced in the same manner as described in Example 1 except for feeding 2.52 l/hr of a 500 g/l solution of TFEA in ethyl acetate, 230 Nl/hr of propylene and 460 ml/hr of the same catalyst as in Example 1 and changing the polymerization temperature to 210° C. The resulting ethylene copolymer had an MFR of 3.0 g/10 min, a number average molecular weight of 19,800 and a TFEA content of 3.1 mol%.

EXAMPLE 3

An ethylene copolymer was produced in the same manner as in Example 1 except for feeding 100 ml/hr of a 200 g/l solution of 17-fluorolauryl acrylate in ethyl acetate in place of the TFEA solution and changing the polymerization temperature to 223° C. The resulting ethylene copolymer had an MFR of 2.0 g/10 min, a number average molecular weight of 20,600 and a 17-fluorolauryl acrylate content of 0.05 mol%.

EXAMPLE 4

To a 1.5 liter-volume autoclave type continuous reactor equipped with a stirrer were fed 32 kg/hr of ethylene, 590 ml/hr of a 70 g/l solution of 2-(4-benzoyl-3-hydroxyphenoxyethyl)methacrylate (BHPEMA) in toluene, 400 Nl/hr of propylene and 550 ml/hr of a 3 g/l solution of t-butyl peroxy isopivalate in n-hexane as a catalyst, and the mixture was allowed to polymerize under a pressure of 2,200 kg/cm$^2$ at a temperature of 200° C. The resulting ethylene copolymer had an MFR of 3.0 g/10 min, a number average molecular weight of 19,900 and a BHPEMA content of 0.09 mol%.

EXAMPLE 5

An ethylene copolymer was produced in the same manner as in Example 4 except for feeding 3.42 l/hr of a 70 g/l solution of BHPEMA in toluene, 330 Nl/hr of propylene and 590 ml/hr of the same catalyst as used in Example 4 and changing the polymerization temperature to 200° C. The resulting ethylene copolymer had an MFR of 4.0 g/10 min, a number average molecular weight of 18,800 and a BHPEMA content of 0.45 mol%.

EXAMPLE 6

An ethylene copolymer was produced in the same manner as in Example 4 except for feeding 590 Nl/hr of a 70 g/l solution of 2-hydroxy-4-(2-hydroxy-3-methacryloxy)propoxybenzophenone (HHMPB) in toluene in place of the BHPEMA solution and changing the polymerization temperature to 201° C. The resulting ethylene copolymer had an MFR of 3.0 g/10 min, a number average molecular weight of 20,000 and an HHMPB content of 0.08 mol%.

EXAMPLE 7

To a 1.5 liter-volume autoclave type continuous reactor equipped with a stirrer were fed 32 kg/hr of ethylene, 4.2 l/hr of a 100 g/l solution of 2-hydroxy-4-(2-methacryloyloxyethyloxy)benzophenone in ethylene acetate, 150 Nl/hr of propylene and 0.44 l/hr of a 3 g/l solution of t-butyl peroxy pivalate in n-hexane as a catalyst, and the mixture was allowed to polymerize under a pressure of 2,200 kg/cm$^2$ at a temperature of 210° C. The resulting ethylene copolymer had an MFR of 3.0 g/10 min. It was confirmed by NMR analysis that the 2-hydroxy-4-(2-methacryloyloxyethyloxy)benzophenone component is present in the copolymer substantially at random and has a content of 1.3 mol%.

EXAMPLE 8

To a 1.5 liter-vollume autoclave type continuous reactor equipped with a stirrer were fed 32 kg/hr of ethylene, 3.2 l/hr of a 10 g/l solution of 2-hydroxy-4-(2-methacryloyloxyethyloxy)benzophenone in ethylene acetate, 160 Nl/hr of propylene and 0.42 l/hr of a 3 g/l solution of t-butyl peroxy pivalate in n-hexane as a catalyst, and polymerization was carried out under a pressure of 2,400 kg/cm$^2$ at a temperature of 210° C. The resulting ethylene copolymer had an MFR of 4.0 g/10 min. NMR analysis of the copolymer revealed that the 2-hydroxy-4-(2-methacryloyloxyethyloxy)benzophenone component is substantially at random and has a content of 0.1 mol%.

EXAMPLE 9

To a 1.5 liter-volume autoclave type continuous reactor equipped with a stirrer were continuously fed 32 kg/hr of ethylene, 10 l/hr of a 100 g/l solution of 4-(2-acryloyloxyethyloxy)-2-hydroxybenzophenone in ethylene acetate, 1,100 Nl/hr of propylene and 1.1 l/hr of a 3 g/l solution of t-butyl peroxy pivalate in n-hexane as a catalyst, and polymerization was carried out under a pressure of 2,000 kg/cm$^2$ at a temperature of 220° C. The resulting ethylene copolymer was found to have a number average molecular weight of 3,900 by gel-permeation chromatography. NMR analysis of the copolymer revealed that the 4-(2-acryloyloxyethyloxy)-2-hydroxybenzophenone component in the copolymer is substantially at random and has a content of 3 mol%.

EXAMPLE 10

To a tubular reactor having an inner diameter of 4.8 mm and a length of 63 m were continuously fed 35 kg/hr or ethylene, 5.4 l/hr of a 50 g/l solution of 2-hydroxy-4-(2-acryloyloxyethyloxy)benzophenone in ethyl acetate, 120 Nl/hr of propylene and 5 Nl/hr of air as a catalyst, and polymerization was carried out under a pressure of 2,200 kg/cm$^2$ at a temperature of 225° C.

The resulting ethylene copolymer had an MFR of 5.0 g/10 min. The content of the 2-hydroxy-4-(2-acryloyloxyethyloxy)benzophenone comonomer was found to be 5.2% by weight immediately after the preparation and to be 5.1% by weight after the copolymer was immersed in ethyl acetate at 50° C. for 24 hours. The conversion of this comonomer was as high as 92% by weight. When the ethylene copolymer immediately after the preparation was press-molded into a sheet of about 1 mm in thickness, no whitening was observed with the passage of time because of the high conversion of the comonomer.

TEST EXAMPLE 1

Each of the ethylene copolymers prepared in Examples 1 to 6 and, for comparison, commercially available high-pressure-processed polyethylene, Yukalon ZR 30 R (MFR=1.0 g/10 min; produced by Mitsubishi Petrochemical Co., Ltd.) was evaluated for various characteristics according to the following methods;

(1) Density:
Measured in accordance with JIS K6760
(2) Gel Fraction:
Measured in accordance with JIS C3005
(3) Electricity Treeing Property:
The polymer under test was molded at 160° C. and 150 kg/cm$^2$ into a 5 mm thick sheet, and the sheet was cut out to a size of 20 mm×20 mm. A needle electrode (a) having a diameter of 1 mm and a tip curvature radius of 5 μm was injected into the cut piece to a depth of 15 mm. On the other hand, the side opposite to the needle-injected side was coated with silver paste (b) to prepare a specimen as shown in FIG. 1. An alternating current was applied to the specimen at a voltage increasing rate of 500 V/sec, and the voltage at which electricity treeing began to occur was measured.

Figure 2:
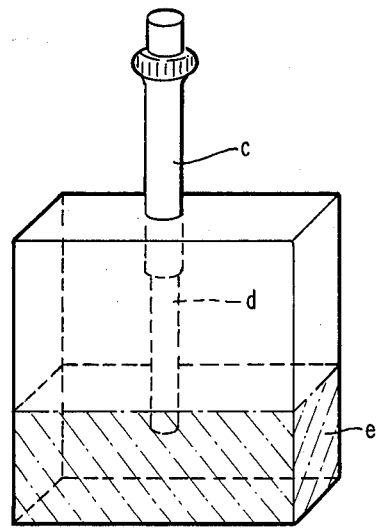
FIG. 2 illustrates a specimen for measurement of water treeing property.

(4) Water Treeing Property:

The same cut piece (25 mm×25 mm×5 mm) as prepared in (3) above was used. An injection needle (c) having a diameter of 1 mm was once injected into the test piece from the top surface to a depth of 20 mm and then drawn out by 15 mm while adjusting distilled water (d) into the pore formed by withdrawal of the needle. Thus, an aluminum foil (e) having a width of 10 mm was affixed around the side surfaces of the test piece so that the bottom region of the test piece was covered at a height of 10 mm to obtain a specimen as shown in FIG. 2. After an alternating current of 60 Hz and 10 KV was applied to the specimen between the needle and the foil for 50 hours, an average length of a water tree which grew was measured by a light microscope.

(5) Impulse Breakdown Voltage:

A blown film having a thickness of 30 μm was produced by blow-film extrusion using a blow molder having a screw diameter of 40 mm at a temperature of 150° C. and at a blow-up ratio of 1.5. Negative-polar standard impulse voltage was applied to the film starting at about 50% on the estimated breakdown voltage, and the voltage was stepwise increased at a rate of 2 KV/3 steps. The voltage at which the film came to a breakdown was measured.

(6) Non-combustibility:

An oxygen index was determined according to JIS K7201.

(7) Light-Resistance:

A 2 mm thick pressed sheet was irradiated with light for 1,000 hours using a sunshine weatherometer. The tensile strength and tensile elongation of the sheet were measured before and after the light-irradiation in accordance with JIS K6760, and deterioration of these characteristics by light was determined by the following formula:

$$\frac{\text{Characteristic Value After Irradiation}}{\text{Characteristic Value Before Irradiation}} \times 100\ (\%)$$

The results of these tests are shown in Table 1 below together with the MFR and the comonomer content of the ethylene copolymers as determined in Examples 1 to 6.

TABLE 1

|  | Example 1 | Example 2 | Example 3 | Example 4 | Example 5 | Example 6 | Yukalon ZF 30R |
|---|---|---|---|---|---|---|---|
| MFR (g/10 min) | 2.6 | 3.0 | 2.0 | 3.0 | 4.0 | 3 | 1 |
| Comonomer Content (mol %) | 0.29 | 3.1 | 0.05 | 0.09 | 0.45 | 0.08 | — |
| Density (g/cm³) | 0.924 | 0.948 | 0.923 | 0.927 | 0.923 | 0.928 | 0.920 |
| Electricity Treeing Property (KV): | | | | | | | |
| at 30° C. | 5.3 | 5.3 | 5.3 | 7.5 | 7.0 | 8.0 | 5.3 |
| at 90° C. | 3.6 | 3.6 | 3.6 | 4.6 | 4.7 | 5.0 | 3.6 |
| Water Treeing Property (μm) | 8 | 10 | 7 | 5 | 20 | 10 | 70 |
| Impulse Breakdown Voltage (MV/cm): | | | | | | | |
| at −198° C. | 9.3 | 7.5 | 8.0 | 6.8 | 6.5 | 6.9 | 7.2 |
| at 30° C. | 5.6 | 5.4 | 5.8 | 4.9 | 5.0 | 5.2 | 5.4 |
| at 90° C. | 4.7 | 3.8 | 4.8 | 3.6 | 3.4 | 4.0 | 3.8 |
| Non-Combustibility (Oxygen Index) | 20 | 23 | 17 | | | | 17 |
| Light-Resistance (%) | | | | | | | |
| Tensile Strength: | | | | 80 | 95 | 80 | 50 |
| Tensile Elongation | | | | 75 | 90 | 75 | 25 |

TEST EXAMPLE 2

A hundred parts by weight of each of the ethylene copolymers obtained in Examples 1 to 6 and Yukalon ZF 30R, 2 parts by weight of dicumyl peroxide as a crosslinking agent and 0.3 part by weight of Santonox R as an antioxidant were kneaded in a Brabender mixer set at 110° C. for 5 minutes. The resulting blend was preliminarily molded to a sheet having a thickness of 50 μm or 5 mm using a hot press et at 130° C., and the sheet was further hot-pressed at 180° C. under a gauge pressure of 100 kg/cm² for 20 minutes to produce a crosslinked polymer sample.

Characteristics of these crosslinked polymers were evaluated in the same manner as described in Test Example 1 except that the impulse breakdown voltage was measured using a pressed sheet having a thickness of 50 μm. The results obtained are shown in Table 2.

TABLE 2

|  | Example 1 | Example 2 | Example 3 | Example 4 | Example 5 | Example 6 | Yukalon ZF 30R |
|---|---|---|---|---|---|---|---|
| Polymer Composition (part by weight) | | | | | | | |
| Ethylene Polymer | 100 | 100 | 100 | 100 | 100 | 100 | 100 |
| Dicumyl Peroxide | 2 | 2 | 2 | 2 | 2 | 2 | 2 |
| Santonox R | 0.3 | 0.3 | 0.3 | 0.3 | 0.3 | 0.3 | 0.3 |
| Gel Fraction (wt %) | 80 | 80 | 80 | 80 | 80 | 80 | 85 |
| Impulse Breakdown Voltage (MV/cm): | | | | | | | |
| at −198° C. | 9.0 | 7.2 | 8.0 | 6.9 | 6.9 | 6.8 | 7.0 |
| at 30° C. | 5.7 | 5.0 | 5.6 | 4.7 | 4.9 | 4.8 | 5.0 |
| at 90° C. | 4.9 | 4.4 | 4.9 | 4.0 | 4.1 | 4.2 | 4.3 |

TABLE 2-continued

| | Example 1 | Example 2 | Example 3 | Example 4 | Example 5 | Example 6 | Yukalon ZF 30R |
|---|---|---|---|---|---|---|---|
| Water Treeing Property (μm) | 7 | 9 | 4 | 2 | 10 | 5 | 40 |

TEST EXAMPLE 3

A polymer blend comprising 19 parts by weight of a high-pressure-processed ethylene homopolymer having an MFR of 0.5 g/10 min and a specific gravity of 0.922 g/cm³ and 1 part by weight of the ethylene copolymer obtained in Example 7 was molded into a film having a thickness of 100 μm using a blow molder having a screw diameter of 40 mm at a temperature of 160° C. The resulting blown film was exposed outdoors to the south at an angle of 45° with the earth at Yokkaichi, Mie, Japan. After the elapse of 2 years, 95% of the initial elongation at break was retained, indicating high weather resistance.

For comparison, the same weathering test as described above was carried out on a blown film prepared in the same manner as above but replacing the ethylene copolymer with 2-hydroxy-4-octoxybenzophenone, that is a typical ultraviolet absorbent, in an amount equimolar to the comonomer component in the ethylene copolymer, i.e., 2-hydroxy-4-(2-methacryloyloxyethyloxy)benzophenone. As a result, the elongation at break after 7 month-exposure was reduced to 50% or less the initial value.

When the same weathering test as above was carried out on a blown film prepared from the above-described ethylene homopolymer, the elongation at break after 3-month-exposure was reduced to 50% or less the initial value.

TEST EXAMPLE 4

The ethylene copolymer obtained in Example 8 was molded into a film having a thickness of 50 or 120 μm by blow-extrusion using a blow molder having a screw diameter of 40 mm at 160° C.

Figure 3:
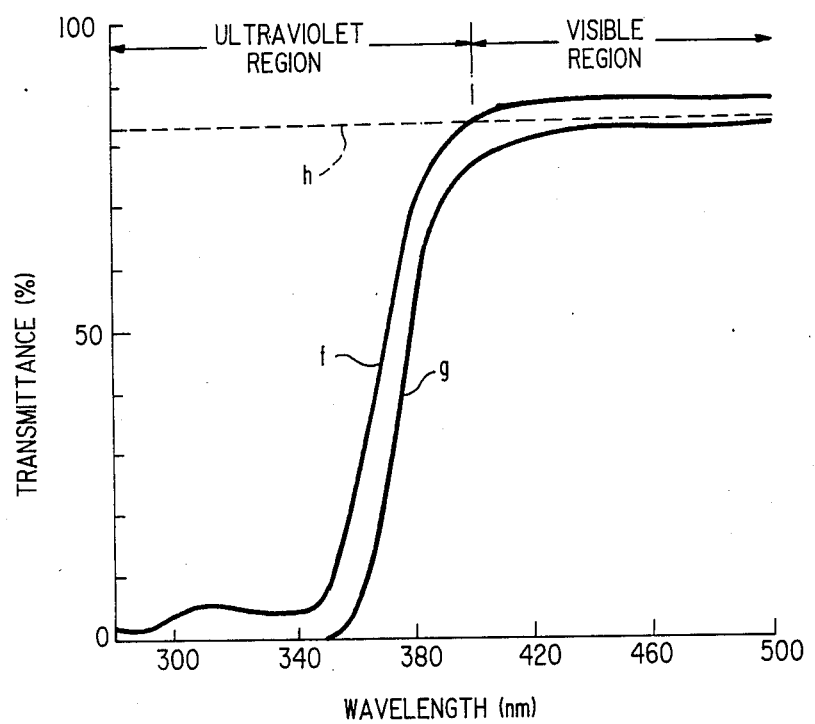
FIG. 3 shows a ultraviolet absorption curve of the ethylene copolymer film according to the present invention and a commercially available ethylene homopolymer film obtained by high-pressure polymerization.

The resulting films were colorless and transparent and exhibited excellent ultraviolet absorbing properties as shown in FIG. 3 with great promise of utility as packing films for commercial goods which are susceptible to discoloration or denaturation by exposure to ultraviolet rays.

To the contrary, a 120 μm thick blown film produced from a high-pressure-processed ethylene homopolymer having an MFR of 0.5 g/10 min and a specific gravity of 0.922 showed substantially no ultraviolet absorbing properties as shown in FIG. 3.

In FIG. 3, the solid line (f) refers to the result on the film, having a thickness of 50 μm, of the ethylene copolymer of the present invention. The solid line (g) refers to the result on the film, having a thickness of 120 μm, of the ethylene copolymer of the present invention. The broken line (h) refers to the result on the film, having a thickness of 120 μm, of the ethylene homopolymer.

While the invention has been described in detail and with reference to specific embodiments thereof, it will be apparent to one skilled in the art that various changes and modifications can be made therein without departing from the spirit and scope thereof.

What is claimed is:

1. An ethylene copolymer for use as electrical insulation comprised of ethylene monomer and an ethylenically α,β-unsaturated ester monomer of the formula:

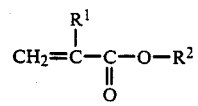

wherein $R^1$ is hydrogen or methyl and $R^2$ is a fluorinated alkyl group having from 1 to 15 carbon atoms, said ester monomer unit being present in the copolymer in an amount of from 0.1 to 1.6% by weight.

2. The ethylene copolymer of claim 1, wherein said copolymer has a density ranging from 0.88 to 1.00 g/cm², a degree of crystallinity of from 25 to 70% and a number average molecular weight ranging from 1,000 to 100,000.

3. The ethylene copolymer of claim 1, wherein said copolymer further contains a monomer unit selected from the group consisting of vinyl esters, alkyl acrylic esters, alkyl methacrylic esters and ethylenically α,β-unsaturated acids.

4. The ethylene copolymer of claim 1, wherein said fluorinated alkyl group is trifluoroethyl, difluoromethyl, monofluoroethyl, monofluoromethyl, trifluoromethyl, tetrafluoroethyl, pentafluoroethyl, pentafluoropentadecanyl, heptafluorodecanyl, heptadecylfluorodecanyl or hexafluorononyl.

* * * * *